July 27, 1954
P. J. HOHNSTEIN ET AL
2,684,827
GATE FOR IRRIGATION PIPES
Filed Dec. 28, 1949
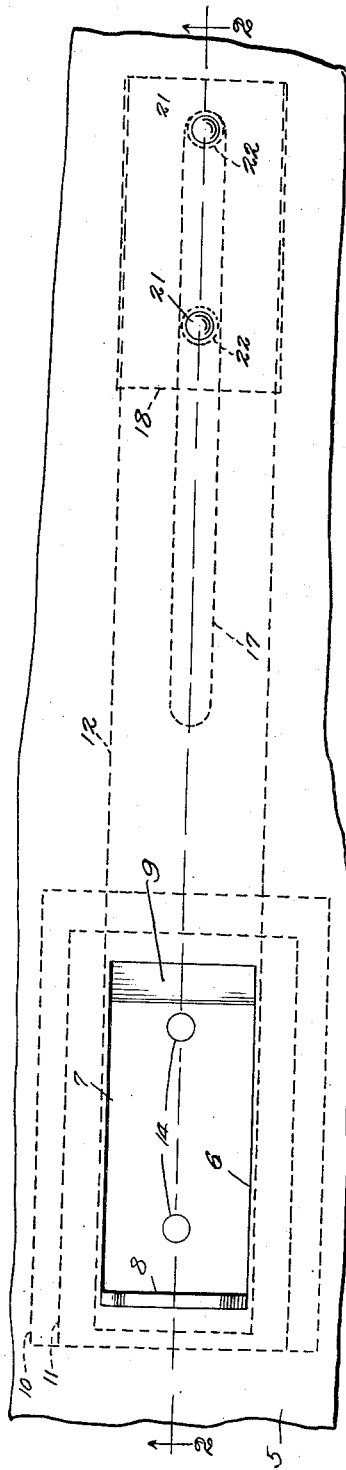
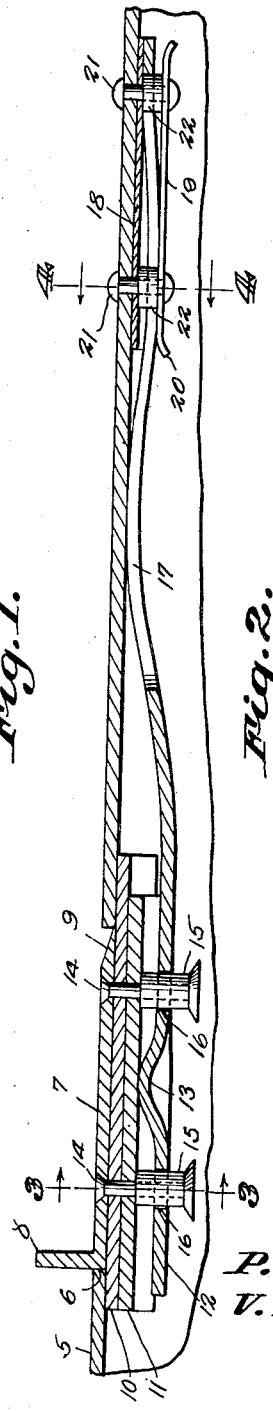
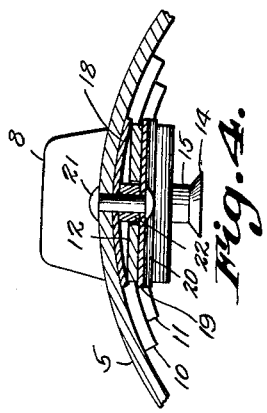
P. J. Hohnstein
V. D. Bruckman
INVENTORS
BY C. A. Snow & Co.
ATTORNEYS.

Patented July 27, 1954

2,684,827

UNITED STATES PATENT OFFICE 2,684,827

GATE FOR IRRIGATION PIPES

Paul J. Hohnstein and Victor D. Bruckman, Hastings, Nebr.; said Bruckman assignor to said Hohnstein Application December 28, 1949, Serial No. 135,448

2 Claims. (Cl. 251—145)

This invention relates to a gate for irrigation pipes.

An important object of the present invention is to provide a gate for irrigation pipes mounted upon a spring slide in a manner whereby the gate will be self-aligning in closed position, so as to seal off an irrigation pipe opening with full effectiveness.

Another important object is to provide a gate of the character described which will seal the opening at slight pressure; will be easily operated; will permit gate adjustment while the irrigation system is in operation; and will avoid water losses.

Another important object is to provide a gate construction so designed as to cause water pressure within the pipe to be additive to the spring pressure upon the gate, so as to make for a tighter seal.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a fragmentary plan view of an irrigation pipe showing the gate in closed position.

Fig. 2 is a longitudinal section on line 2—2 of Fig. 1.

Fig. 3 is a transverse section on line 3—3 of Fig. 2.

Fig. 4 is a transverse section on line 4—4 of Fig. 2.

Referring to the drawings in detail, 5 designates a conventional irrigation pipe, this having the rectangular gate opening 6.

The gate includes a closure member formed of a plurality of superposed and connected plates the uppermost of which is a rubber retainer plate 7 formed to the size of and fitting within the opening 6, said plate 7 having at one end the upturned ear or lip 8 providing a grip for operating the gate and having its other end beveled as at 9 for ease of movement of the plate to open position.

Underlying the rubber retainer plate 7 is the rubber seal plate 10 larger in length and breadth than the opening 6 and adapted to apply a sealing action to the edges of the opening when the gate is in closed position as shown in Fig. 2, for the purpose of effecting a seal. It will be understood that the rubber seal plate 10, and also the rubber retainer plate 7 if desired, would be made of a type of rubber resistant to the corrosive action of the elements, impurities in the water, etc.

Underlying the seal plate 10 is the base plate 11 of the closure member, this being formed from metal material that is transversely curved correspondingly to the transverse curvature of the pipe as shown in Fig. 3.

Extending under the closure member is one end of a spring slide 12, said end portion that underlies the closure member having a medially disposed upwardly extended rounded-off boss or dimple 13, this upwardly extended projection of the spring slide being the only portion of the slide that is in contact with the closure member, and constituting in effect a fulcrum or pivot upon which the closure member has rocking movement.

Spaced rivets 14 connect the several plates 7, 10 and 11 constituting the closure member and also connect said closure member to the spring slide, the lower portions of said rivets having the spacer bushings 15 extended through the over-sized openings 16 of the spring slide. Said openings 16 are oversized for the purpose of permitting the aforesaid rocking action of the closure member upon the spring slide. Thus, it will be observed that by reason of the medial rockable mounting of the closure member upon the end portion of the spring slide, said closure member will align itself to the curvature of the pipe and of the opening which is to be sealed by the gate.

The other end portion of the spring slide 12 is formed with the elongated longitudinal slot 17 and overlying said slot and second end portion of the spring slide is the wear plate 18 interposed between the slide and the adjacent surface of the pipe for the purpose of preventing the spring slide from wearing into the pipe on repeated use of the gate.

Underlying said second-named end portion of the spring slide is a slide support plate 19, the ends of which are preferably beveled downwardly as at 20 to avoid wearing contact with the spring slide during movement of said slide.

Connecting the spring slide, plates 18 and 19, and pipe 5 are the rivets 21, the lower portions of which are encased by the spacer bushings 22. The purpose of providing the spacer bushings 22 may be noted from Fig. 4, wherein the spring slide is shown as flat in cross section, said spacer bushings being employed to space the slide from the plates overlying and underlying the slide, so as to permit free longitudinal sliding movement of said spring slide when opening and closing the gate.

Additionally, as noted from Fig. 2, the spring slide is longitudinally formed with a compound curve, this having been found to be particularly advantageous in connection with the gate of the invention, in that the spring applies the desired pressure to the closure member, while still applying said pressure equally to all portions of the closure member so that the seal of the opening will be uniformly even throughout the full periphery of the gate opening.

As will be appreciated, when it is desired to open the gate opening, the user manually grasps the ear or lip 8, or employs a suitable tool if desired, whereupon the closure member is depressed slightly so that it will slide under the pipe and away from the opening, against the pressure of the spring slide. During said sliding movement of the closure member, the slot 17 of the spring slide will permit the desired longitudinal shifting of the gate assembly.

In this connection, it may be readily noted that the gate can be opened to any desired extent, so as to uncover the gate opening 6 either partially or entirely as desired. In any event, assuming that the opening 6 is uncovered fully, the ear or lip 8 will provide a stop limiting further movement of the gate to the right in Fig. 2.

It should be noted at this point that the rubber retainer plate 7 not only provides a guide fitting the closure member properly to the opening in the closed position of the gate, but also when the gate is shifted to the right in Fig. 2 so as to underlie the pipe surface, the rubber retainer plate 7 will space the seal plate 10 entirely from the pipe surface, so that said rubber seal plate never has sliding movement against any surface which sliding movement would tend to wear said seal plate 10 unduly.

Further, it is to be noted that the base plate 11 is, like the seal plate 10, greater in length and breadth than the dimensions of the gate opening, and this is for the purpose of preventing the closure member from blowing through the opening when pressure within the pipe is too great.

Of importance, additionally, is the mounting of the closure member upon the spring slide. The closure member is so mounted upon said slide as to be fulcrumed medially of the closure member for rocking movement upon the end portion of the slide. As a result, said closure member aligns itself to the contour of the pipe so that the seal is applied uniformly throughout the edges of the opening, thus to effect a fully watertight seal that will be efficient over an indefinite period of time.

What is claimed is:

1. In an elongated irrigation pipe having an elongated longitudinally extending substantially rectangular discharge opening extending therethrough, a gate for controlling the discharge of fluid through the discharge opening comprising an elongated spring slidably mounted within the pipe remote from the discharge opening to move longitudinally from a position in which it overlays the discharge opening to a position adjacent one end of said discharge opening, a dimple carried by the spring and extending outwardly therefrom toward the wall of the pipe having the discharge opening, a rigid base plate carried by the spring and rockably engaging the dimple, a resilient sealing plate carried by the base plate and adapted to engage the pipe adjacent the discharge opening for closing the opening, and a resilient retainer plate carried by the sealing plate for engagement with the walls of the discharge opening when the sealing plate is in closing relation to the discharge opening.

2. In an elongated irrigation pipe having an elongated longitudinally extending substantially rectangular discharge opening extending therethrough, a gate for controlling the discharge of fluid through the discharge opening comprising, a spring slidably mounted within the pipe, said spring having a longitudinally disposed slot extending inwardly from one end thereof, rivets extending inwardly from said irrigation pipe securing said spring to said pipe for movement longitudinally beneath the discharge opening, said gate also including a base plate, said spring having a dimple formed in the inner surface thereof presenting a bearing boss contacting with said base plate on which said gate pivots with respect to said spring, and a yieldable sealing plate carried by said gate for engaging the pipe adjacent to the discharge opening restricting the discharge of fluid through such opening.

References Cited in the file of this patent

UNITED STATES PATENTS

| Number | Name | Date |
|---|---|---|
| 363,872 | Willard | May 31, 1887 |
| 544,069 | Pearson | Aug. 6, 1895 |
| 587,439 | Jenkins | Aug. 3, 1897 |
| 697,358 | Penner | Apr. 8, 1902 |
| 704,971 | Campbell | July 15, 1902 |
| 1,211,237 | Rockwell | Jan. 2, 1917 |
| 2,074,502 | Congable | Mar. 23, 1937 |
| 2,472,677 | Phillips | June 7, 1949 |

FOREIGN PATENTS

| Number | Country | Date |
|---|---|---|
| 567,555 | Great Britain | 1943 |